(12) United States Patent
Geldner (10) Patent No.: US 6,796,585 B1
(45) Date of Patent: Sep. 28, 2004

(54) BELLOWS FOR A COMPENSATOR AND COMPENSATOR PERTAINING THERETO AND METHOD FOR PRODUCING BELLOWS

(76) Inventor: Siegfried Geldner, Obere Mangfalistr. 13, D-83059 Kolbermoor (DE)

( * ) Notice: Subject to any disclaimer, the term of this patent is extended or adjusted under 35 U.S.C. 154(b) by 0 days.

(21) Appl. No.: 09/937,633

(22) PCT Filed: Mar. 23, 1999

(86) PCT No.: PCT/EP99/01983

§ 371 (c)(1),
(2), (4) Date: Sep. 24, 2001

(87) PCT Pub. No.: WO00/57094

PCT Pub. Date: Sep. 28, 2000

(51) Int. Cl.[7] ................................. F16L 51/02
(52) U.S. Cl. .................... 285/226; 285/414; 285/424
(58) Field of Search ..................... 285/226, 225, 285/121.1, 123.17, 124.5, 424, 414, 227

(56) References Cited

U.S. PATENT DOCUMENTS

| | | | | |
|---|---|---|---|---|
| 2,657,075 A | * | 10/1953 | Schwester et al. ....... | 285/226 X |
| 3,299,417 A | * | 1/1967 | Sibthorpe ................ | 285/226 X |
| 3,811,174 A | * | 5/1974 | Pintard ..................... | 285/424 |
| 3,934,905 A | * | 1/1976 | Lockard ..................... | 285/424 |
| 4,027,902 A | * | 6/1977 | Tanikawa ................ | 285/226 X |
| 4,183,557 A | * | 1/1980 | Hinden ..................... | 285/424 |
| 4,221,502 A | * | 9/1980 | Tanikawa ................ | 285/226 X |
| 4,265,473 A | * | 5/1981 | Russo ..................... | 285/424 |
| 4,861,631 A | * | 8/1989 | Hinden et al. ............. | 285/424 |
| 5,058,934 A | * | 10/1991 | Brannon .................... | 285/226 |
| 5,791,696 A | * | 8/1998 | Miyajima et al. ........... | 285/226 |
| 5,806,899 A | * | 9/1998 | Norikawa et al. ....... | 285/226 X |
| 5,813,704 A | * | 9/1998 | Naito ....................... | 285/226 |
| 6,315,332 B1 | * | 11/2001 | Aschoff et al. ......... | 285/226 X |

FOREIGN PATENT DOCUMENTS

| | | | | |
|---|---|---|---|---|
| DE | 28 47 892 | | 11/1978 | ....................... 16/2 |
| DE | 3123625 A | | 1/1983 | ....................... 16/2 |
| DE | 36 04 803 | | 2/1986 | ....................... 16/2 |
| DE | 41 40 870 | | 12/1991 | ..................... 16/14 |
| DE | 93 07 616 | | 5/1993 | ..................... 16/14 |
| DE | 295 03 547 | | 3/1995 | ................... 16/107 |
| EP | 0 148 286 | | 12/1983 | ..................... 16/23 |
| EP | 0 282 608 | | 3/1987 | ....................... 16/4 |

* cited by examiner

Primary Examiner—Lynne H. Browne
Assistant Examiner—David E. Bochna
(74) Attorney, Agent, or Firm—Blakely, Sokoloff, Taylor & Zafman (57) ABSTRACT

A bellows for a compensator as an elastic connection between two duct connection pieces or flange frames arranged from each other in the longitudinal direction is presented. The bellows contains a cavity arrangement between an outer wall, an inner wall, and curved sections at each end of the outer and inner walls. The outer wall, inner wall and curved sections are continuously connected. The cavity arrangement between the outer wall and the inner wall is designed as a single-chamber cavity. The single-chamber cavity between the outer wall and the inner wall is formed in a manner such that it is free from connecting webs. The material of the bellows is flexible.

36 Claims, 7 Drawing Sheets

BELLOWS FOR A COMPENSATOR AND COMPENSATOR PERTAINING THERETO AND METHOD FOR PRODUCING BELLOWS

BACKGROUND OF THE INVENTION

Bellows for a compensator and associated compensator and method for producing a bellows

1. Field of the Invention

The invention relates to a bellows for a compensator as an elastic connection between two duct connection pieces which are arranged [lacuna] from each other in the longitudinal direction, and to a corresponding compensator using a bellows of this type according to the preamble of claim 1 and 20, and to a method for producing a bellows according to claim 25.

2. Description of Related Art

Compensators of this type having a bellows structure which is known in accordance with the preamble of claim 1 are used in particular for decoupling structure-borne noise and/or as an expansion-compensating means in ventilation ducts in air conditioning technology. They are also suitable for compensating for thermal expansions and installation inaccuracies.

Ducts, in particular ventilation ducts in air conditioning technology, may, as is known, have different cross sectional shapes. EP 0 148 286 A1 basically discloses a flange connection for the mutual fastening of duct subsections, which are essentially rectangular in cross section, for air-conditioning duct systems, in which case the flange connection known therefrom can be used both for the installation of fixed duct walls and for the installation of an elastic wall so as to form a bellows.

EP 0 282 608 A1 discloses a duct structure which is comparable with regard to the flange profile, but is suitable for duct pieces which are circular in cross section. In this case too, the flange connection known therefrom can be used with fixed duct walls, which generally consist of sheet metal, or with the insertion of an elastic wall material to form a bellows.

DE 41 40 870 A1 which forms the generic type has disclosed a duct connecting piece in the form of a compensator. In the longitudinal direction or direction of attachment, the compensator contains two encircling flange structures which are spaced apart in the longitudinal direction or direction of attachment and are oriented transversely with respect to the longitudinal direction, said flange structures being used to enable the compensator to be fixedly connected to a next duct piece. The flange structure may be rectangular or generally polygonal in plan view, but in a modified embodiment may also be circular or oval. In this case, the bellows consists of a duct skin which is produced from a material web in an appropriate size and is tightly joined together to form a tube which is closed in the circumferential direction. Furthermore, both a sealing lip and a securing section are also formed on the duct skin, in order thereby to secure the duct skin in a suitable manner in a bead-shaped depression of the flange profiles.

Although these structures are in principle well-established, it is the object of the present invention to provide bellows and a compensator which have been improved further with respect to said structures, and to provide a corresponding process for producing bellows of this type.

BRIEF SUMMARY OF THE INVENTION

According to the invention, the object is achieved with regard to the bellows [lacuna] features specified according to claim 1 and, with regard to the compensator, according to claim 21 and, with regard to a method of producing a bellows according to the invention, according to claim 25. Advantageous refinements are specified in the subclaims.

The bellows according to the invention and the compensator according to the invention have clear advantages over the prior art.

According to the invention, the bellows now consists not only of a flexible or elastic duct skin, but is designed as a double-walled hollow chamber system. In this case, the bellows according to the invention can be referred to in the widest sense as tubular, on account of its double wall system, even before it is used and before it is fitted in a compensator.

The bellows according to the invention and the compensator according to the invention have the surprising and advantageous effect that on account of its tubular, double-walled design, the bellows does not form any pronounced depressions or any material overlaps in its bending regions when it buckles at the corners of a square, rectangular or polygonal compensator, but also in the case of a compensator which is round or partially round in cross section. In the case of structures according to the prior art, this results in the formation of virtually dead corners, angles and pockets through which air, if used, does not flow or virtually no longer flows. In contrast, instead of the pronounced depressions or overlaps of the bellows material which occur in conventional structures according to the prior art and include the formation of shielded or dead zones and pockets, in the case of the bellows according to the invention the wall material lying on the inside is, if the need arises, deformed by static compressions, and the outer bellows material by static expansions in such a manner that deformations of a comparatively large size are produced and are formed over a large area comparable to gentle hills and valleys. This reliably avoids it being possible for the bellows material to be so distorted that it protrudes in a comparatively pronounced manner into the duct interior, through which air flows, partially overlaps with adjacent wall material and forms shielded dead corners and pockets through which the air basically flowing through the duct piece during use does not flow.

The bellows material according to the invention and the compensators according to the invention are therefore particularly suitable also for use in critical regions, for example in clinics where the intention is to reliably prevent bacteria from being able to permanently settle and become lodged in such dead corners and pockets as are formed in the prior art.

Within the scope of further refinements, the bellows material according to the invention can have numerous additional advantages.

It has proven advantageous if the bellows material is, in its entire width, i.e. in other words in the fitted state, of double-walled design in the longitudinal direction of the compensator and preferably does not have any inner webs. As a result, the inner wall ensures maximum freedom for the deformations with respect to the outer wall, advantageously assisting in the resultant, abovementioned aims and advantages.

Furthermore, there are formed, preferably on the tubular bellows material, not only corresponding sealing lips and sealing projections which interact with corresponding sealing lips or sealing projections of an adjacent channel subsection (so as in general to ensure the tightest possible connection of the duct pieces to be connected to one another), but there are also provided, preferably on the bellows, further securing projections, for example securing lips. These can preferably be provided with a barbed strip or barbed lip via which the bellows formed in this manner can be inserted without any problem and without further assisting means or tools in a corresponding groove-shaped depression or bead, provided with an undercut, in the flange pieces and can thereby be connected fixedly to the flange pieces.

The bellows material can be produced from all suitable materials, for example from polymeric material, elastic and/or flexible material, elastomeric material. EDPM material or else other sorts of plastic, for example polyester, PVC, etc, are likewise suitable.

The bellows material can be manufactured from flame-resistant, ray-absorbing, noncombustible, acid proof, heat-deflecting and/or thermally stable material.

The bellows is preferably produced by extrusion. In this case, the bellows can simultaneously also be produced together with a flange piece by extrusion, so that an additional connection of the thus formed bellows to flange pieces is no longer necessary. Should the stiffness and hardness of the flange region extruded with it not be sufficient, then an additional part used for reinforcing purposes, for example a metal flange piece or a plastic flange piece, may possibly also be attached and connected here to the flange leg.

In this case, preferably in the case of a flange section extruded together with a bellows, there can be cut in or punched out at intervals along the longitudinal side of the flange extruded with it, corresponding to the size of the compensator to be dimensioned, transverse recesses at corresponding intervals, in order to pivot the bellows together with the flange, for example through 90° with respect to each other, at these points. Suitable corner pieces, for example made of plastic or of steel comparable to the other corner pieces used, can then be inserted at the thus formed corner regions. Said corner pieces may, for example, be correspondingly plugged in or clipped in, in particular if there are formed on the flange pieces extruded with it corresponding counter recesses, i.e. grid-type [sic] depressions or grid-type [sic] projections which make possible the desired, fixed connection to the corner piece.

Both in the last-mentioned case, but also in the formation of a securing lip on the bellows, it is likewise possible to use different materials in the bellows, which is thus of integral design. In terms of manufacturing, provision may be made here that, in particular in the region of [sic] the securing lip or—if the bellows is equipped at the same time with a flange section—this flange section is produced with a significantly harder material than the rest of the remaining bellows material. A "coextrusion process" is conventionally also mentioned here, said process making it possible to produce a plastic part having a different material composition and, for example, hardness via two extruder dies.

Further advantageous effects can be obtained, particularly in the fitted state, by the cavity being filled with suitable materials, for example sheet-like materials, such as woven inserts, wire meshes, rubber mats, plastic lattices etc., or, for example, is stuffed or filled by other, tear-resistant materials.

In general, the hollow chamber system of the bellows can be filled with reinforcing, heat-insulating and/or sound-absorbing materials or else with materials which bring about an overall increase and improvement in the stability and/or load-bearing capacity of the bellows.

It is likewise possible to fill the hollow chamber, i.e. the double wall system of the bellows, with materials in the form of granules, for example styropor beads, quartz materials, metallic powder or similar materials.

Finally, materials used for the security against tearing and for the strength can additionally be inserted not only into the hollow chamber system, but, for example, reinforcing materials can also be incorporated into the bellows material during the extrusion or general production process.

In order to increase the strength against tearing, i.e. in particular with regard to the tensile stress possibly acting in the longitudinal direction of a compensator formed in this manner, provision may be made for a woven insert or other reinforcing insert to be inserted at the same time, for example in the bellows, preferably in the hollow chamber system, which insert is preferably nonextensible, with the consequence that once the fitted state has been reached, the edge of the reinforcing insert is clamped at the opposite end sections of the double-walled bellows system, with the result that the tensile forces are absorbed and supported via the reinforcing insert.

Finally, the bellows may also be provided [sic] by the introduction of fins preferably running in the longitudinal direction of the compensator (i.e. transversely with respect to the direction of extrusion) during extrusion, in order thereby to make the bellows material, and therefore the compensator in its longitudinal direction, even more stable, since a limitation on expansion is obtained thereby. Instead of the fins, steel elements or spring steel elements can be incorporated corresponding to the direction or connected in another manner to the bellows material in order to obtain this limitation on expansion.

The invention will be explained below with reference to exemplary embodiments, in which in detail.

BRIEF DESCRIPTION OF THE DRAWINGS

DETAILED DESCRIPTION OF THE INVENTION

Figure 1:
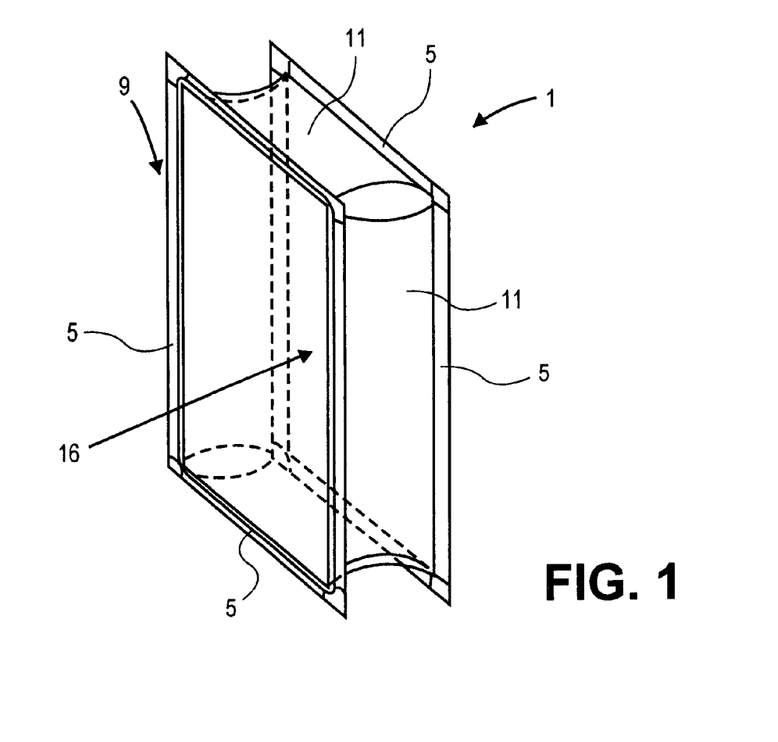
FIG. 1: shows the schematic, perspective illustration of a compensator which is rectangular in cross section.

FIG. 1 shows, in a schematic, perspective illustration, an elastic connector which is also referred to below as a compensator and is used in practice in particular for the coupling structure-borne noise and as an expansion-compensating means in ventilation ducts for air conditioning systems.

Figure 2:
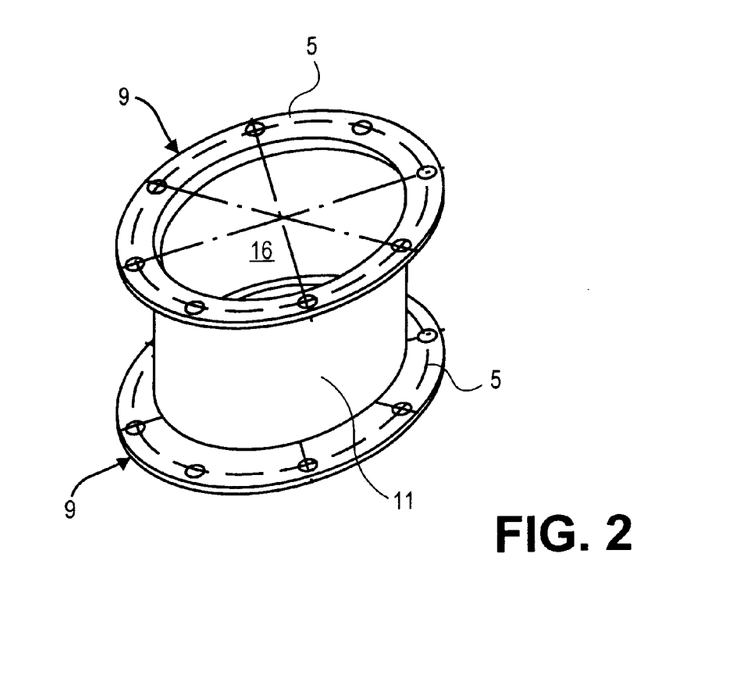
FIG. 2: shows a schematic, perspective illustration of a compensator which is circular in cross section.

The compensator 1 shown in FIG. 1 has a polygonal cross section i.e. a rectangular cross section. In contrast, the compensator shown in FIG. 2 is cylindrical and therefore has a circular cross section. However, the profile cross sections of the flange profiles, which are provided on the end side in each case in the direction of attachment, may be identical, which will be discussed below.

Figure 3:
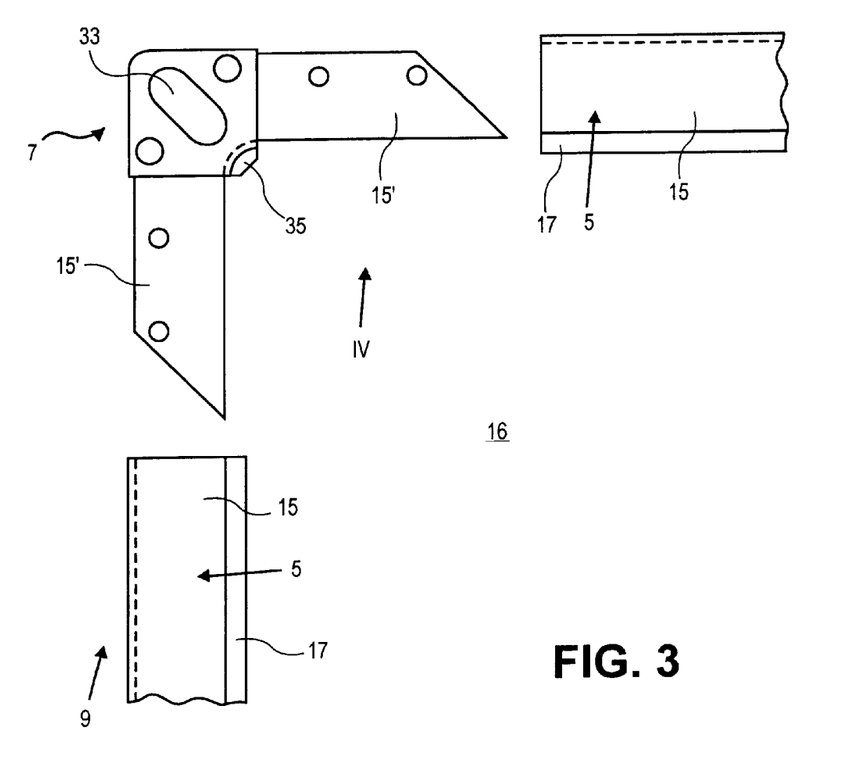
FIG. 3: shows a schematic end view of part of an encircling flange connection structure for connecting a compensator to a next duct piece, the said structure being in a dismantled state.
Figure 4:
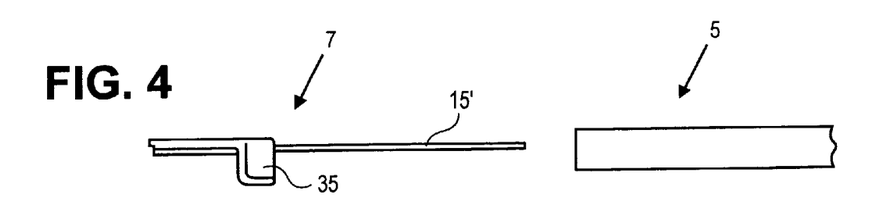
FIG. 4: shows a transverse view along the arrow direction IV in FIG. 3.

The rectangular flange connection for the compensator shown in FIG. 1 is partially reproduced in an exploded illustration in FIGS. 3 and 4. It can be seen therefrom that four flange profiles 5 can be put together [lacuna] the rectangular frame and can be joined together via corner brackets 7 to form an integral flange frame 9 to which the bellows 11, which is visible from the outside in FIGS. 1 and 2, is then fastened.

Figure 5:
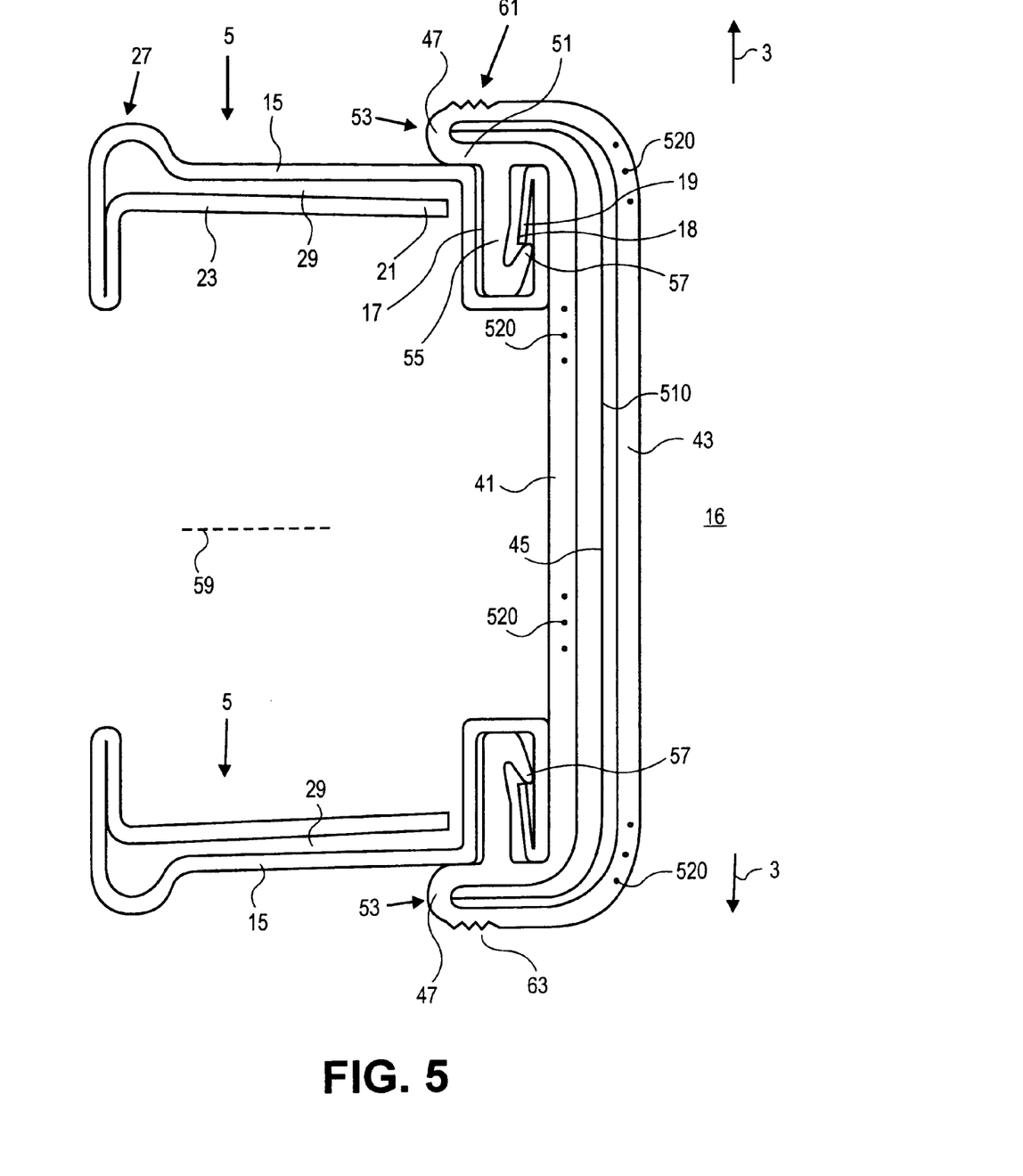
FIG. 5: shows a cross sectional illustration through a flange profile corresponding to the line V—V in FIG. 1, FIG. 2 and FIG. 3 together with a first, exemplary embodiment, in schematic form, of a bellows according to the invention.

The flange profile 5, which is produced in plan view and in a side view rotated 90° with respect thereto, in FIGS. 3 and 4 and in a cross sectional illustration in FIG. 5 (where the sectional illustration according to FIG. 5 reproduces, in cross section, both an upper flange profile 5 and an opposite, lower flange profile 5, as connected to an embodiment of a bellows which is yet to be discussed below) has a central installation leg 15 which, in the fitted state, lies oriented transversely with respect to the longitudinal direction or direction of attachment 3 of the compensator, i.e. parallel to the directly adjacent, next flange profile 5 of a flange arm 9 of a subsequent duct piece.

On the inside of the duct, i.e. lying facing the duct interior 16, the installation leg 15 merges into a U-shaped groove 17 which does not absolutely have to be rectangular, but may, for example, also have an undercut which is more circular, in the manner of a bead, as is basically known from DE 41 40 870 A1.

The inner material end 18 of the flange material is, in the cross section according to FIG. 5, folded back protruding in a barb-like manner in the direction of the groove 17 and therefore forms a barb-like retaining strip 19 whose function will be discussed in greater detail below.

In order to obtain greater stiffness by forming an angular stiffening portion 27 which extends transversely with respect to the installation leg 15 and protrudes over the latter, the outer boundary edge 21 of the flange profile 5, which edge lies opposite the material end 18, is folded twice convexly and once concavely, then merges into a parallel leg 23 which runs at a small distance adjacent to and parallel to, or at least in places parallel to the installation leg 15. The boundary edge 21 then ends shortly before the groove 17 which is U-shaped in cross section.

The plug-inlet 15' of the installation leg 15 can then be plugged in each case into the thus formed, slight gap 29 between the installation leg and the parallel leg 15, 23, in which case a secure, fixed connection is formed by the gap 29, when not plugged in, being smaller than the material thickness of the stretch [sic] leg 15'.

Recesses 33, for example in the form of elongated holes, can then be made in the direct corner region of the installation leg 15, and can be used to fixedly connect together two flange frames 9, whose end side can be brought together, of two duct pieces, for example a duct piece and a compensator shown in FIG. 1.

As also emerges from the illustration according to FIGS. 3 and 4, a bead 35, which has a semicircular profile in plan view, is made directly on the inside in the corner of the installation leg 15, in a direct extension of the groove- or bead-shaped depression 17.

In the case of a circular comparator [sic] according to FIG. 2, the flange profile 5 explained above has the same cross section as reproduced in FIG. 5, i.e. corresponds with regard to the cross section to a flange profile 5 which does not have a curved profile, as is used for forming a comparator [sic] which is rectangular in cross section in accordance with FIG. 1.

The bellows structure will be discussed in the following text.

FIG. 5 furthermore shows a first exemplary embodiment for a bellows according to the invention which is of double-wall design in a cross sectional illustration and comprises an outer wall 41 and an inner wall 43 lying on the inside of the duct. As a result, a cavity 45 is formed between the outer wall and the inner wall 41, 43, which cavity extends virtually over the entire width of the bellows 11, i.e. over the entire axial length of the compensator shown in FIG. 1 or 2, arrow 3 reproducing the direction of attachment, which corresponds to the axial longitudinal direction of the duct piece.

This bellows may, for example, be produced by extrusion as an endless bellows of any desired length running perpendicular with respect to the plane of the drawing.

According to the exemplary embodiment according to Figure [lacuna], this bellows, at the upper and lower edge thereof, is angled at approximately 90° with respect to its central, double-walled section in a manner such that it runs away from the inside of the duct, the outer and inner walls 41, 43 being connected to each other at their end via a respective curved section 47.

A respective securing lip 55 having a hook lip 57 protruding in the direction of the outer wall 41 is formed directly adjacent to the curved section 47, on those sides 51 of the two end sections 53 which point toward each other, said lips being arranged symmetrically with respect to a central longitudinal plane 59.

Formed on the end sections 53, on the opposite side to the hook lips 57, is a respective sealing projection 61 which, in the exemplary embodiment shown, comprises a plurality of longitudinal ribs 63 which are arranged next to one another and run in the longitudinal direction.

For installation purposes, a bellows formed in this manner has only to be inserted by the sealing lip 65 into the abovementioned, U-shaped groove 17 until the hook lip 57 grips behind the barb-like retaining element 19 in the U-shaped groove 17, so that after this sealing lip of the bellows is fitted into the correspondingly encircling groove 19 of a flange frame 9, this bellows is fastened captively and fixedly to the flange profile 5. In order to produce a bellows which is closed in the circumferential direction, the latter has merely to be cut, i.e. cut off, to the correspondingly correct length, with reference to the size of the compensator, and then inserted in an encircling manner in the U-shaped groove 17.

The bellows can then be bonded, welded or sealed in a suitable manner in some other way to one another [sic] at the intersecting points lying adjacent to one another.

The exemplary embodiment which has been explained reveals that the bellows material, i.e. the double wall system with a cavity being formed between the outer wall and inner wall is already tubular in itself, and the bellows can be produced in this longitudinal direction, for example by extrusion. In use, i.e. in the fitted state for producing a compensator, the side edges of the bellows, i.e. its transverse extent, then lie in the axial longitudinal direction of the compensator, since the bellows, after having been cut to an appropriate length in the circumferential direction with formation of a duct interior is shaped to form a closed, double-walled casing, and its cut edges, which then lie next to one another, are tightly closed by [sic] a suitable manner.

Since, in the case of a rectangular comparator [sic] according to FIGS. 1, 3 and 4, a corresponding bead 35 is also formed on the inside of the installation leg 15, the sealing lip 55 can continue there from the one U-shaped groove 17 in one flange profile 5 to the corresponding groove in a next flange profile which is offset by 90°.

In the following text, a slightly modified exemplary embodiment will be explained with reference to FIG. 6, which differs from that of FIG. 5 especially by the fact that the double-walled bellows is not at the outset provided with end sections 53 angled by approximately 90°.

Figure 6:
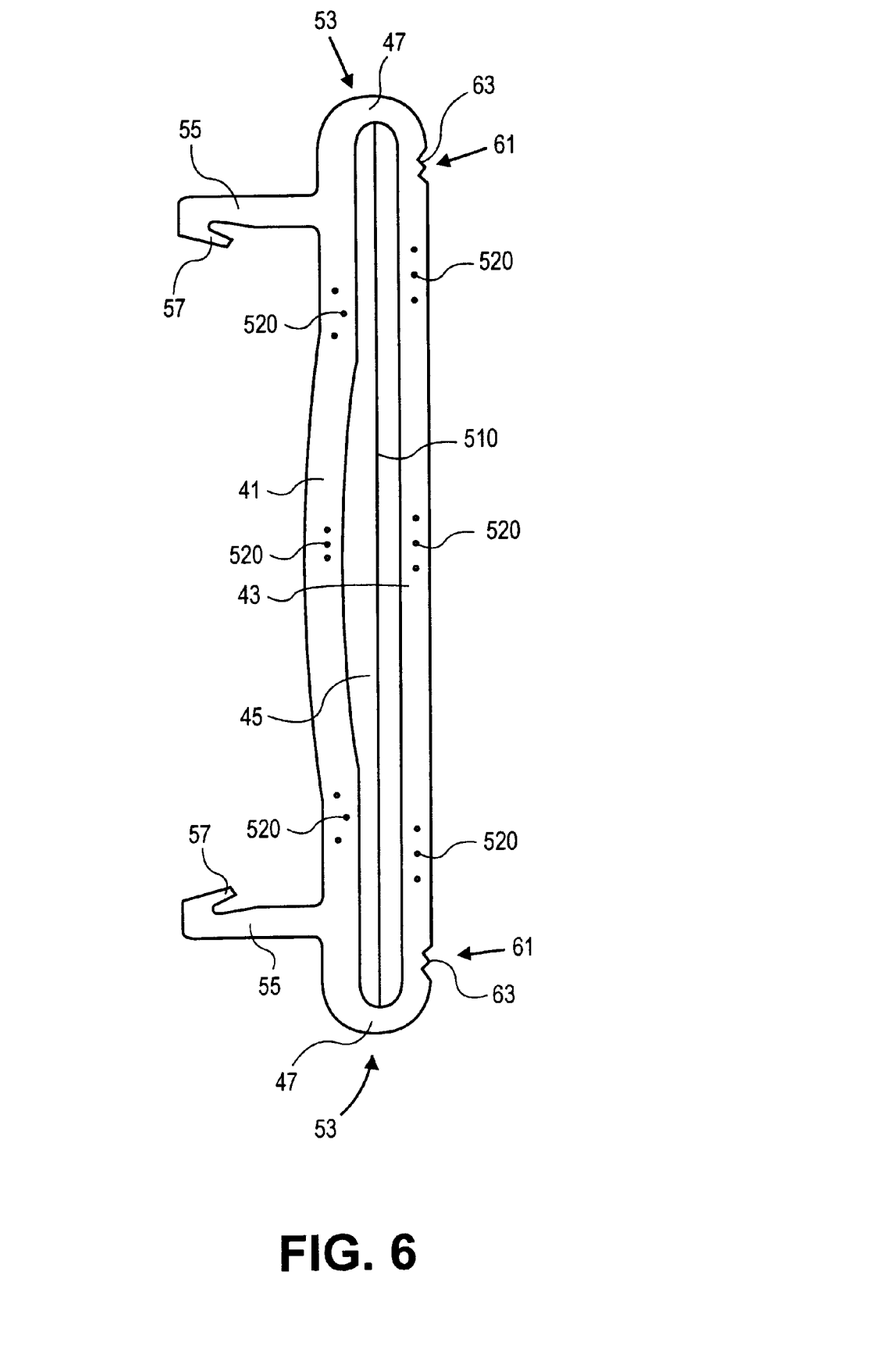
FIG. 6: shows an exemplary embodiment of a bellows according to the invention modified with respect to FIG. 5.

The expansion bellows shown in cross section in FIG. 6 tapers off at its end sections 53, essentially without being angled, in extension of the inner wall and outer wall 41, 43, in which case the sealing projection 61 and the securing lip 55 of the hook lip 57 are formed lying opposite each other adjacent to the curved section 47 lying at the end.

With reference to this exemplary embodiment, it is also shown that the two walls may, for example, also differ in thickness. In the exemplary embodiment shown, the inner wall 43 is slightly thinner than the outer wall 41. In addition, the outer wall 41 is slightly convex in shape outwardly, i.e. bulges from its original shape.

In this exemplary embodiment, the installation and fitting take place in such a manner that first of all the one hook strip 57 is inserted, on one end side of the bellows formed in this manner, into the securing groove 17 of a flange profile 5, and then the tubular bellows is bent over downwards and its opposite securing and hook lip 57 is inserted into the flange frame 9, which is offset on the end side, of the grooves 17 formed there. After installation has taken place, a configuration having folded-over, i.e. bent-over end sections 53 comparable to the bellows structure according to FIG. 5 is produced.

Since the bellows is produced from a suitable material, for example from plastic, from EDPM, from rubber or rubber-like materials, from polymeric materials, from flexible or at least slightly elastic materials, it is ensured that the material cannot buckle and come to lie in a sheet-like manner on other sections of the bellows material when the latter is fitted into a corresponding compensator. Even in the case of rectangular compensators, the material can only take on deformations in the manner of gentle humps and depressions, comparable to hills and valleys, with the result that no undercut or shielded pockets can be formed. The deformations thus do not have any buckling points, but are rather characterized by bending radii which are of comparatively large dimensions, at least compared with other plastic sheets or fabric-like materials for the duct skin. Deformations forming on the inner wall generally have bending radii which are not, or not on average, smaller than 5 mm, and are generally even larger than 8 mm, 10 mm, 12 mm or even 15 mm.

The material which [sic] a Shore hardness of about 150 to 170 at least in the inner wall region, in which case at least the securing lip, and in the process, in particular the hook lip 57, can be produced from harder material, for example having a Shore hardness of over D65, i.e. from D65 to D90.

The corresponding material can be formed [sic] a thickness of more than 1 mm, for example by 2 mm or even thicker still, and in the process can be made in elastic configuration so as to be comparatively flexible and easily deformable. On account of the curved end sections 53, in particular, the tubular bellows material has the tendency to form a gentle curve profile on the inner wall, with the formation of undercuts and of an air flow and pockets through which the flow does not pass being avoided.

Depending on requirements, the bellows material which has been explained can be provided with additional woven reinforcements serving to strengthen it or by [sic] placing fibers 520 into the material etc. It may be of integral design, or it can consist of parts which can be joined together by sewing, welding, riveting or by other elements. A further, sheet-like reinforcement 510 can be placed in the hollow chamber and is used to absorb tensile loads in the axial longitudinal direction, and therefore in the transverse direction with respect to the extrusion direction of the bellows material, and for this purpose consists, for example, of a fabric web. This fabric web should preferably reach as far as the end sections 53 in the cavity 45. Since when fitting a compensator formed in this manner to a next duct piece a sheet-like insert which is inserted on the inside, for example a woven insert, can also be clamped in place at the same time, said insert, when it is of shorter dimensions than the inner wall or outer wall 43, 41, can absorb the tensile forces without them having to be absorbed by the bellows material.

Finally, ribs or fins running transversely with respect to the longitudinal direction of the bellows, i.e. from one end section 53 to the opposite end section 53, and serving as expansion-limiting means in the longitudinal direction of the compensator may also be put in place during the production process.

Otherwise, depending on the intended use and requirements, the material can be manufactured from flame-resistant, ray-absorbing, noncombustible, acidproof, heat-deflecting and/or thermally stable material.

Furthermore, the abovementioned cavity 45 of the tubular bellows material can be filled or stuffed, depending on requirements, with suitable sheet-like materials, for example fabric inserts, wire meshes, rubber mats, plastic lattices etc., which are used, in particular, to give the bellows a greater load-bearing capacity. However, other tear-resistant materials can equally well be inserted and used too.

Moreover, however, the cavity 43 may also be filled with other suitable amorphous material, for example material in the form of granules, styropor, quartz or similar materials.

Figure 7:
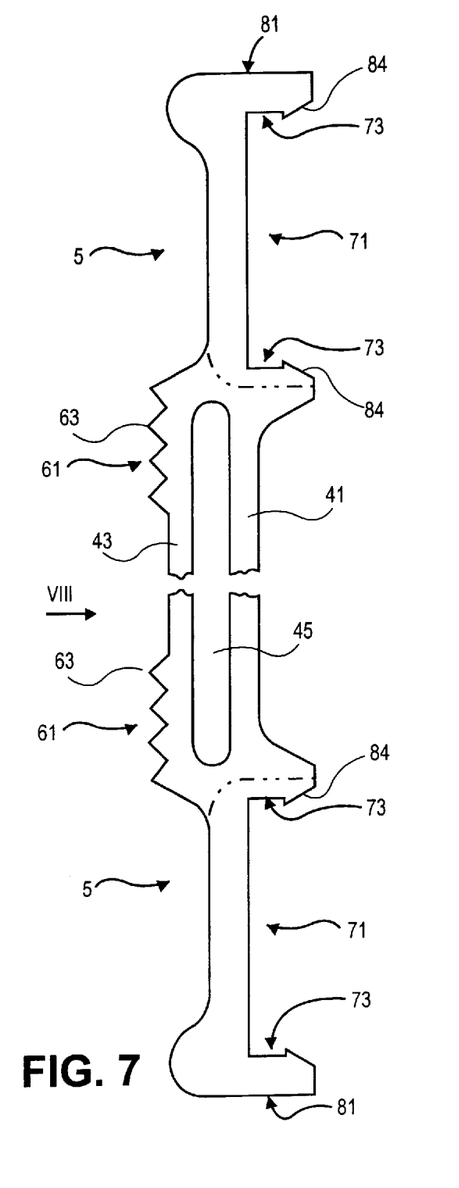
FIG. 7: shows a modified exemplary embodiment in a partial schematic cross sectional illustration, transverse with respect to the extrusion direction, through a bellows provided with a flange projection extruded with it.

With reference to FIG. 7, a modification is shown in which flange profiles 5 are extruded together with the bellows material. The shaping of the lateral flange projection is at least similar as in the use of the flange profiles explained with reference to FIGS. 1 to 6.

In the exemplary embodiment according to FIG. 7, the flange profiles 5 extruded at the same time are provided on the rear with a corresponding, rearwardly open recess 71 having opposite undercuts 73 which ultimately serve for the insertion of the plug-in legs 15'.

Figure 8:
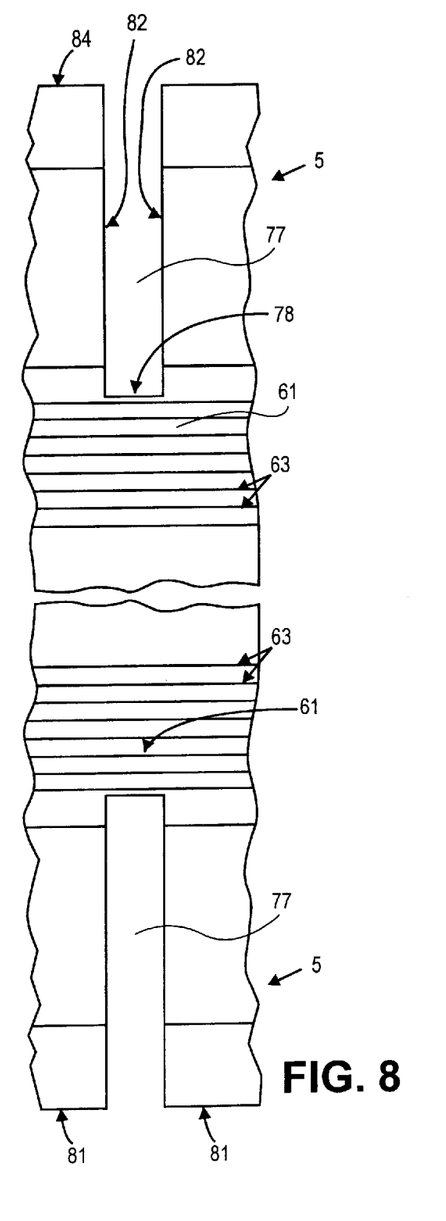
FIG. 8: shows a partial plan view corresponding to the partial illustration VIII in FIG. 7.

During production of a cross section rectangular compensator made of bellows material and a flange profile extruded with it, there are made in the bellows material, corresponding to the height and width of the compensator, from the flange side 75, corresponding to the plan view according to FIG. 8, lateral slots or incisions 77 (for example by punching), which start from the longitudinal edges 81, specifically running at right angles thereto, which reach close to the sealing projection 61. The flange sections separated in this manner can then be pivoted away from one another about a pivot axis 78, which is perpendicular with respect to the plane of the drawing in FIG. 8, at the inner end of the incision until the cut edges 82, which are parallel in FIG. 8, of the flange sections articulated in this manner lie at right angles to each other. If the flange sections formed in this manner are then further pivoted to the rear through 90° with respect to the central, double-walled tube section, then they take up a position which is reproduced in FIG. 9 and in which the corresponding plug-in leg 15' of a corner bracket can then be plugged into the undercuts or recesses 71 formed in this manner. If the plug-in legs 15' are shaped in accordance with the above-explained recess 71 with a corresponding undercut 73, then the plug-in legs can be plugged in here, so that all in all a stable flange frame 9 is produced. In the process, the plug-in leg can also be directly clipped in from the rear in accordance with the wedge-shaped run-on surface 84 adjacent to the undercuts 73 until the undercuts 73 fit over the relevant plug-in leg 15' of a corner piece and thereby produce a fixed connection to the corner bracket.

Figure 9:
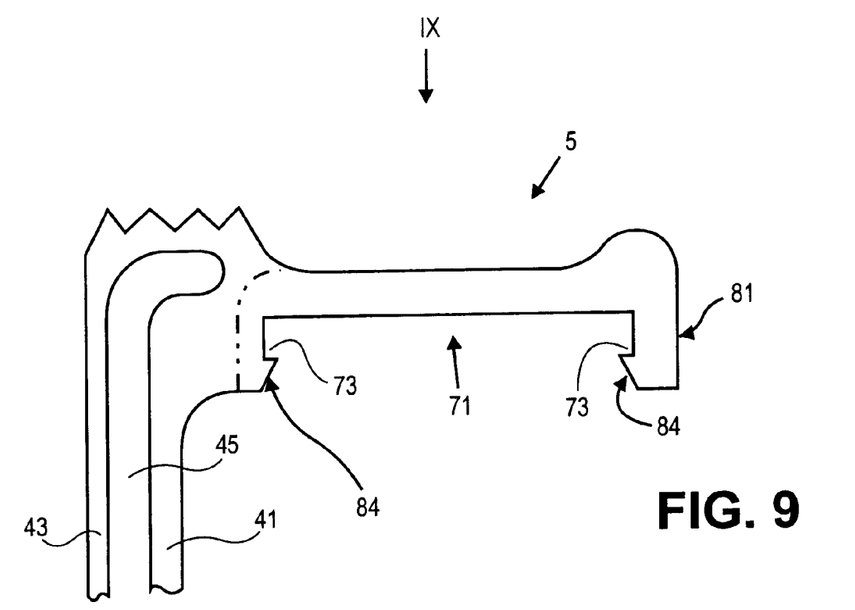
FIG. 9: shows a corresponding cross sectional illustration comparable to the exemplary embodiment according to FIG. 7, but in which the flange section extruded with it is formed in an angular orientation of approximately 90° with respect to the central bellows section.
Figure 10:
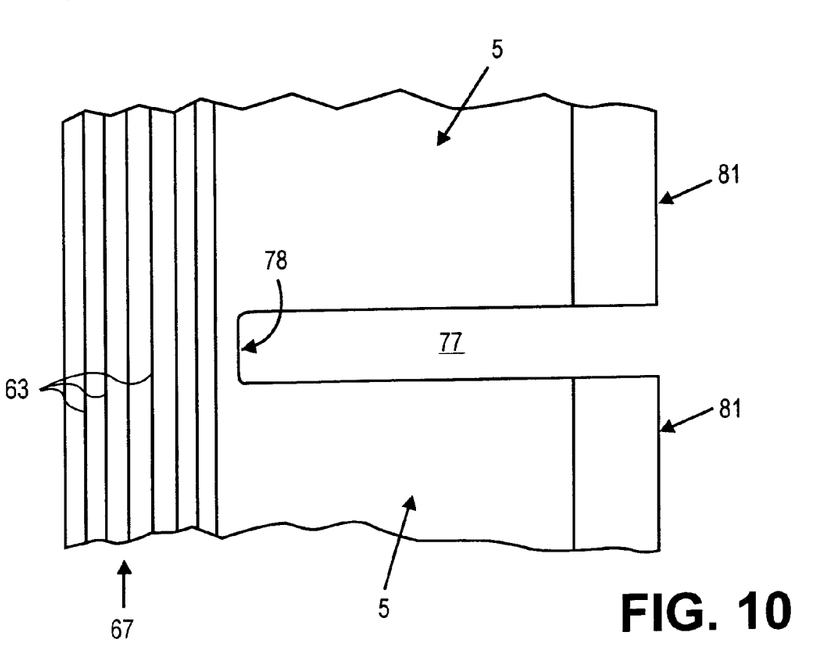
FIG. 10: shows a plan view of FIG. 8 corresponding to the arrow illustration IX in FIG. 8.
Figure 11:
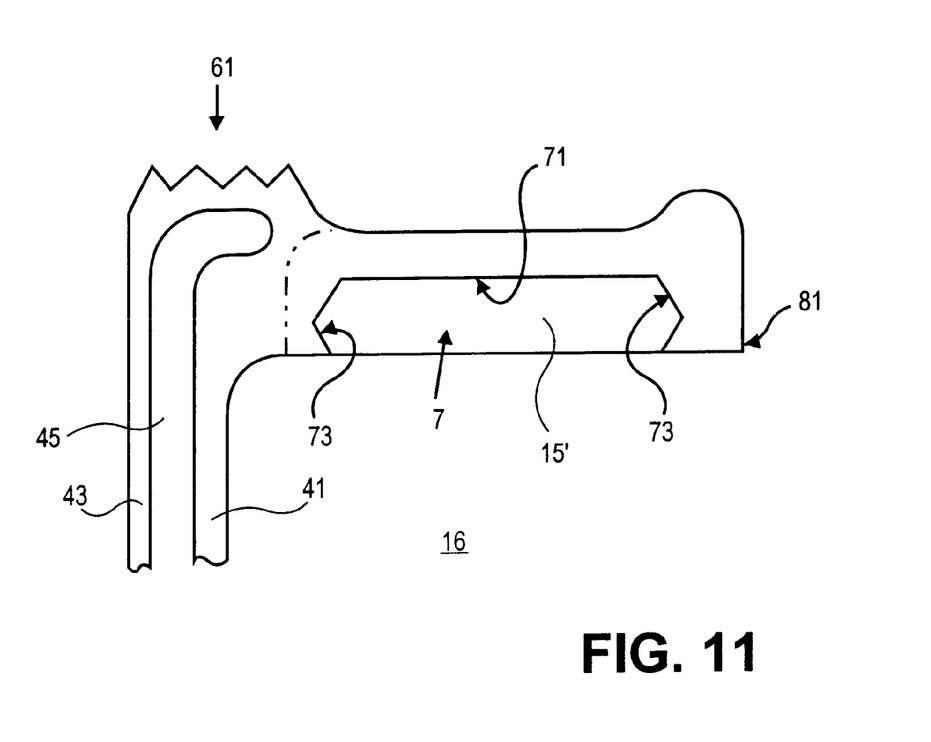
FIG. 11: shows an exemplary embodiment which has been modified with respect to FIG. 9 and in which a plastic corner has been clipped to the bellows with the extruded flange projection, in order to produce a compensator.

A slightly modified exemplary embodiment is shown with reference to FIGS. 10 and 11, once in cross section and once in plan view and comparable to the illustration according to FIGS. 8 and 9, the exemplary embodiment differing from FIGS. 8 and 9 only in that the flange projection together with the end section of the bellows has already been produced during the extruding process at an approximately 90° orientation to the central, double-walled bellows section, in a comparable manner to the flange projection in the exemplary embodiment according to FIG. 5. The further processing to produce a compensator then takes place as explained in principle with reference to FIGS. 8 and 9.

As an alternative and supplement, a corner bracket 7 which has plug-in legs 15' and is formed from plastic can also be plugged in in accordance with the cross sectional illustration according to FIG. 11. In this exemplary embodiment, the recess 71 is likewise provided with undercuts 73, namely undercuts formed in a V shape in cross section, with the result that the plug-in legs can be plugged here into the recess 71 formed in this manner and provided with an undercut 73, simply by pressing from the rear. A rectangular flange frame, and therefore ultimately a rectangular compensator, can also be produced easily and without any problem as a result.

What is claimed is:

1. A bellows for a compensator (1) as an elastic connection between two duct connection pieces or flange frames (9) arranged from each other in the longitudinal direction, which bellows contains a cavity arrangement between an outer wall (41), an inner wall (43), and curved sections (47) at each end of said outer and inner walls (41, 43), said outer wall (41), said inner wall (43) and said curved sections (47) are continuously coupled, wherein:
the cavity arrangement between the outer wall and the inner wall (41, 43) is designed as a single-chamber cavity,
the single-chamber cavity between the outer wall and the inner wall (41, 43) is formed in a manner such that it is free from connecting webs,
the single-chamber cavity between the outer wall and the inner wall (41, 43) extends over the entire length of the bellows (11) in the longitudinal direction or direction of attachment (3), and
the material of the bellows (11) is flexible.

2. The bellows as claimed in claim 1, wherein the cavity (45) between the outer wall and the inner wall (41, 43) is formed in a manner such that it is free from webs in the interior.

3. The bellows as claimed in claim 2, wherein the tubular, double-walled bellows material is produced by extrusion.

4. The bellows as claimed in claim 3, wherein the outer wall (41) and the inner wall (43) differ in material thickness, the outer wall (41) being thicker.

5. The bellows as claimed in claim 4, wherein the outer wall and the inner wall (41, 43) differ in length between their opposite end sections (53), the outer wall (43) being slightly convex in shape outwardly in cross section.

6. The bellows as claimed in claim 5, wherein open opposite end sections (53) which point in the attachment direction (3) and connect the outer wall to the inner wall (41, 43) are a least approximately bead-like or semicircular in cross section.

7. The bellows as claimed in claim 6, wherein the bellows material, with its outer section and inner section, is designed in such a manner that in the unstressed state the thickness of the cavity (45), and therefore the distance between the outer wall and inner wall (41, 43) varies between 1 mm and 2 cm.

8. The bellows as claimed in claim 7, wherein a securing lip (55) is formed directly adjacent to the end sections (53) of said bellows, which end sections connect the outer wall and the inner wall (41, 43) to each other and are offset with respect to each other in one of the longitudinal direction and direction of attachment.

9. The bellows as claimed in claim 8, wherein a hook lip (57) is formed on the securing lip (55).

10. The bellows as claimed in claim 1 or 9, wherein a sealing projection (61) is formed adjacent to the end section (53) and lying opposite the securing lip (55).

11. The bellows as claimed in claim 10, wherein longitudinal grooves or fins running between the two end sections (53) and spaced apart from one another in the transverse direction are formed in the bellows material for the purpose of increasing the tensile strength.

12. The bellows as claimed in claim 11, wherein the bellows material includes reinforcing material to increase the strength.

13. The bellows as claimed in claim 12, wherein the securing lip (55), is formed from harder material than the rest of the material of the bellows, especially the material in the region of the outer wall and inner wall (41, 43).

14. The bellows as claimed in claim 13, wherein the material in the bellows, accept for the securing lip (55), comprises one of plastic, polymeric material, rubber, rubber-like material, EDPM, and.

15. The bellows as claimed in claim 14, wherein the material of the bellows (11) comprises one of flame-resistant, ray-absorbing, noncombustible, acidproof, heat-deflecting, thermally stable, heat-insulating and sound-absorbing material.

16. The bellows as claimed in claim 15, wherein on each of its opposite sides the bellows is provided with a flange profile which is produced, preferably extruded, with it.

17. The bellows as claimed in claim 16, wherein the flange projections extruded with it are produced from harder material than the remaining bellows material.

18. The bellows as claimed in claim 17, wherein the compensator is an elastic connecting element to connect duct connection pieces.

19. The bellows as claimed in claim 18, wherein the cavity (45) of the bellows is filled with a sheet-like material, in particular a tear-resistant material.

20. The bellows as claimed in claim 19, wherein the sheet-like material comprises one of an industrial insert, a wire mesh, a rubber mat, a plastic lattice and a rubber mat and a plastic lattice.

21. The bellows as claimed in claim 20, wherein the sheet-like material is wedged between the end sections (53) of the bellows (11) at the latest after connection to a next duct piece, and in that the width and therefore length of the inserted sheet-like material is shorter in the longitudinal direction and direction of attachment (3) and the effective length of the outer wall or inner wall (41, 43) of the bellows (11).

22. The bellows as claimed in claim 19, wherein the sheet-like material is wedged between the end sections (53) of the bellows (11) at the latest after connection to a next duct piece, and in that the width and therefore length of the inserted sheet-like material is shorter in the longitudinal direction and direction of attachment (3) and the effective length of the outer wall or inner wall (41, 43) of the bellows (11).

23. The bellows as claimed in claims 22, wherein the cavity (45) is filled with a suitable amorphous material, comprising one of styropor beads, quartz, granulated material, and metallic powder.

24. The bellows as claimed in claim 23, wherein the bellows (11), on its opposite longitudinal sides, is comprised with extruded flange profiles (5) that are produced in accordance with one of the height, width and height and width of a cross sectionally polygonal compensator by making lateral incisions (77) which run transversely with respect to the longitudinal direction of the bellows, and the thus articulated flange-profile sections are pivoted away from one another and, by the insertion of corner brackets (7), are connected to form a closed profile frame (9).

25. The bellows as claimed in claim 24, wherein the flange profiles (5) that are extruded with it are provided on one side, preferably on the rear side, with a recess (71) into which one of plug-in and snap-in legs (15') of a corner bracket (7) can be inserted.

26. The bellows as claimed in claim 25, wherein the insertable corner bracket (7) comprises one of metal, steel and plastic.

27. A process for producing a bellows as claimed in claim 17, wherein the bellows material is produced by extrusion.

28. The process as claimed in claim 27, wherein the tubular bellows is extruded with flange sections (5) formed on its opposite longitudinal sides, in that on the longitudinal edges (81) of the opposite flange-profile sections (5) there are cutout or punched out at suitable distances sections or slots which reach only as far as the sealing projection (61) at maximum and run perpendicular with respect to the longitudinal edge (81), and in that the articulated flange-profile sections are bent relative to one another forming an encircling flange frame (9), in which case a corresponding corner bracket (7) is pressed, preferably from behind in the corner regions in a snap-in manner by its installation legs (15") being pressed into the recesses (71).

29. The bellows according to claim 1, wherein the single-chamber cavity (41,43) also extends in the region between securing lips (55) provided on the bellows (11).

30. The bellows according to claim 29, wherein the single-chamber cavity (41, 43) also extends in the region between flange sections (5) which are provided on the bellows (11) or, when the bellows(11) is fitted into a compensator (1), are formed on the compensator.

31. The bellows according to claim 1, wherein the single-chamber cavity (41, 43) also extends in the region between flange sections (5) which are provided on the bellows (11) or, when the bellows(11) is fitted into a compensator (1), are formed on the compensator.

32. The bellows as claimed in claim 6, wherein the bellows material, with its outer section and inner section, is designed in such a manner that in the unstressed state the thickness of the cavity (45), and therefore the distance between the outer wall and inner wall (41, 43) varies between 2 mm and 10 mm.

33. The bellows as claimed in claim 6, wherein the bellows material, with its outer section and inner section, is designed in such a manner that in the unstressed state the thickness of the cavity (45), and therefore the distance between the outer wall and inner wall (41, 43) varies by 5 mm.

34. A bellows for a compensator (1) as an elastic connection between two duct connection pieces or flange frames (9) arranged from each other in the longitudinal direction, which bellows contains a cavity arrangement between an outer wall (41), an inner wall (43), and curved sections (47) at each end of said outer and inner walls (41, 43), said outer wall (41), said inner wall (43) and said curved sections (47) are continuously coupled, wherein:

the cavity arrangement between the outer wall and the inner wall (41, 43) is designed as a single-chamber cavity, the single-chamber cavity between the outer wall and the inner wall (41, 43) is formed in a manner such that it is free from connecting webs, the single-chamber cavity between the outer wall and the inner wall (41, 43) extends in the region between securing lips (55) provided on the bellows (11), and the material of the bellows (11) is flexible.

35. The bellows according to claim 34, wherein the single-chamber cavity (41, 43) also extends in the region between flange sections (5) which are provided on the bellows (11) or, when the bellows(11) is fitted into a compensator (1), are formed on the compensator.

36. A bellows for a compensator (1) as an elastic connection between two duct connection pieces or flange frames (9) arranged from each other in the longitudinal direction, which bellows contains a cavity arrangement between an outer wall (41), an inner wall (43), and curved sections (47) at each end of said outer and inner walls (41, 43), said outer wall (41), said inner wall (43) and said curved sections (47) are continuously coupled, wherein:

the cavity arrangement between the outer wall and the inner wall (41, 43) is designed as a single-chamber cavity, the single-chamber cavity between the outer wall and the inner wall (41, 43) is formed in a manner such that it is free from connecting webs, the single-chamber cavity between the outer wall and the inner wall (41, 43) extends in the region between flange sections (5) which are provided on the bellows (11) or, when the bellows(11) is fitted into a compensator (1), are formed on the compensator, and the material of the bellows (11) is flexible.

* * * * *